United States Patent [19]

Schombourg et al.

[11] Patent Number: 5,981,674
[45] Date of Patent: *Nov. 9, 1999

[54] SILANE, FREE RADICAL GENERATOR, AMINE BLENDS FOR CROSSLINKING OF OLEFIN POLYMERS

[75] Inventors: Jacques Schombourg, Commugny; Willy Furrer, Gingins, both of Switzerland

[73] Assignee: Witco Corporation, Greenwich, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/768,690

[22] Filed: Dec. 18, 1996

Related U.S. Application Data

[60] Provisional application No. 60/016,463, Apr. 29, 1996, and provisional application No. 60/008,739, Dec. 18, 1995.

[51] Int. Cl.⁶ .................................................. C08F 130/08
[52] U.S. Cl. .......................................... 526/279; 525/288
[58] Field of Search ............................................... 526/279

[56] References Cited

U.S. PATENT DOCUMENTS

| | | |
|---|---|---|
| 3,646,155 | 2/1972 | Scott . |
| 4,117,195 | 9/1978 | Swarbrick et al. . |
| 4,302,565 | 11/1981 | Goeke et al. . |
| 4,927,898 | 5/1990 | King, III et al. . |
| 4,946,880 | 8/1990 | Costanzi et al. . |
| 4,948,888 | 8/1990 | Greco et al. . |
| 5,112,919 | 5/1992 | Furrer et al. . |
| 5,412,012 | 5/1995 | Horwatt et al. . |
| 5,418,267 | 5/1995 | Carrozza et al. . |

FOREIGN PATENT DOCUMENTS

| | | |
|---|---|---|
| 0169070 | 1/1986 | European Pat. Off. . |
| 0388321 | 9/1990 | European Pat. Off. . |
| 0472035 | 2/1992 | European Pat. Off. . |
| 0548565 | 6/1993 | European Pat. Off. . |
| 63-170406 | 7/1988 | Japan . |
| 2181437 | 4/1987 | United Kingdom . |

OTHER PUBLICATIONS

Hindered Amine Light Stabilizers as long term heat stabilizers for crosslinked polymers, vol. 273, 1987.
Patent abstracts of Japan—63 170406, 1988.
Heat Stabilization of Crosslinked Polyethylene—May 1989, Ciba–Geigy Ltd. Ad 5.31.

*Primary Examiner*—Bernard Lipman
*Attorney, Agent, or Firm*—Edward Welch; Andrew Reiskind; Timothy Witkowski

[57] ABSTRACT

A composition for crosslinking olefin polymers including an olefinically unsaturated alkoxysilane, a free radical generator, and an organic hindered amine light stabilizer compound, together with a process for crosslinking olefin polymers comprising blending said composition with an olefinic polymer, allowing the silane to graft to the polymer, and causing the grafted polymer to crosslink, preferably by subjecting it to moisture in the presence of a hydrolysis/condensation catalyst.

10 Claims, No Drawings

SILANE, FREE RADICAL GENERATOR, AMINE BLENDS FOR CROSSLINKING OF OLEFIN POLYMERS

This application claims priority from U.S. Provisional Application Ser. No. 60/016,463, filed Apr. 29, 1996, and from U.S. Provisional Application Ser. No. 60/008,739, filed Dec. 18, 1995.

BACKGROUND OF THE INVENTION

The properties of polymers can be modified by crosslinking of the polymer chains. One method for crosslinking which is commonly used is known as "silane crosslinking", i.e., crosslinking using olefinically unsaturated alkoxysilanes. This method involves at least two stages, which may be done together. In the first stage, (a) silane is grafted onto polymer chains in the presence of a free radical generator and in a second stage, (b) crosslinking of the polymer chains occurs through the formation of Si—O—Si bonds as bridges. The grafting step is normally effected while the polymer is in a molten state, most commonly in an extruder, while the crosslinking step is normally carried out after the polymer has been formed into its desired shape, such as a pipe or wire insulation, while the polymer is in a solid state. To effect crosslinking, the intermediate formed by grafting is subjected to moisture, for example, hot water or steam, in the presence of a hydrolysis/condensation catalyst. The two processes most often employed are (1) a two-step process as taught in U.S. Pat. No. 3,646,155 and (2) a one-step process as taught in U.S. Pat. No. 4,117,195.

One important commercial application of silane crosslinking is to crosslink ethylene polymers used as insulation and sheathing compositions for electrically or optically conductive wire and cable. In this application, it is often necessary for the crosslinked insulation to survive extended periods of exposure to heat, light, and air, during which the polymer may undergo degradation such as by embrittlement or discoloration. To prevent or reduce such degradation, it is often desirable to include in the crosslinked polymer one or more stabilizer compounds.

Many such stabilizer compounds reduce oxidative degradation of polyolefins by intercepting free radicals in the polymer and converting them to unreactive forms. Unfortunately, the silane grafting stage described above also involves free radical processes, and therefore stabilizers may interfere with the silane grafting step. Therefore a problem associated with silane crosslinking employing such stabilizer compounds is the difficulty of accurately combining some or all of the silane, free radical generator and hydrolysis/condensation catalyst (some or all of which are liquids) and stabilizers with the base polymer which is a solid to minimize this interference.

BRIEF SUMMARY OF THE INVENTION

This invention relates to a process for crosslinking olefinic polymers and to compositions used to effect said crosslinking. More particularly, the present invention relates to a composition for crosslinking olefinic polymers including an olefinically unsaturated alkoxysilane, a free radical generator, and an organic hindered amine light stabilizer compound ("HALS"), together with a process for crosslinking olefinic polymers comprising blending said composition with an olefinic polymer, allowing the silane to graft onto the polymer, and causing the polymer to crosslink.

DETAILED DESCRIPTION OF THE INVENTION

The present invention solves the problem of accurately combining additives with a polyolefin by mixing certain stabilizers with the olefinically unsaturated alkoxysilane to form a single solution of fixed proportions. This single solution can be metered to the grafting equipment using a single liquid pump instead of a variety of liquid and solid mixers that would be needed to feed separate additive feed streams. This simplification greatly reduces the complexity and cost of the grafting equipment and correspondingly increases its reliability.

In addition, dissolving the HALS compound in a liquid silane dilutes it before it contacts the olefin polymer, and therefore improves its dispersion in the final article. This improved dispersion may allow less of the expensive HALS to be used in a formulation, while still retaining good effectiveness as a stabilizer. If the compositions of the present invention are in contact with transition metals, e.g., Cu, they can reduce the propensity of the metal to catalyze the oxidation of the polymer without the need for a traditional metal deactivator.

It also has been found that blending HALS compounds with an olefinically unsaturated alkoxysilane and the free radical generator needed for crosslinking permits a single stream to be used for all three ingredients without resulting in interference with the grafting process by the HALS compound or destroying the effectiveness of the HALS compound by reaction with the peroxide. The present invention utilizes the following components:

1. Olefinic Polymer

The olefin polymers are those with a single polymerized hydrocarbon olefin having two or more carbon atoms in the monomer molecule (e.g., ethylene or propylene), polymers containing two or more polymerized olefins, or polymers of such olefins modified with one or more copolymerizable monomers that can be monounsaturated or polyunsaturated. Illustratively, such comonomers include propene, isoprene, butene, butadiene, pentene, hexene, heptene, octene, and styrene, as well as many other polymerizable hydrocarbon monomers. Also included are monomers such as the polymerizable unsaturated monomers containing other atoms, such as acrylic and methacrylic acid, acrylonitrile and methacrylonitrile; the esters such as vinyl acetate and the acrylate and methacrylate esters, methyl acrylate, methyl methacrylate, 2-ethylhexyl acrylate, and the like; the vinyl ethers such as vinyl ethyl ether, and the like; the vinyl ketones such as vinyl ethyl ketone and the like; as well as other alpha olefinically unsaturated monomers known to those skilled in the art of olefin homopolymers and copolymers.

The olefin polymers for use herein may have a wide variety of properties. They can be liquids, solids, rubbers, linear, branched, rigid, flexible, etc. They also vary in the amount of hydrocarbon olefin polymerized in the molecules from polyolefins that are 100 percent hydrocarbon olefins, e.g., polyethylene and polypropylene, to polymers in which the hydrocarbon olefin polymerized in the molecule can be as low as about 60 weight percent with the balance comprising one or more of the other types of comonomers.

Ethylene polymers are preferred herein, which polymers contain about 60 weight percent or more polymerized ethylene in the polymer molecule as well as blends of said polymers with one another or with other polymers. Illustrative ethylene polymers include homopolymers of ethylene as well as interpolymers of ethylene with one or more olefins and/or up to about 30 percent by weight of one or more monomers that are copolymerizable or interpolymers of ethylene with such olefins as propylene, butene-1, isobutylene, hexene-1, 4-methyl-pentene-1, pentene-1, octene-1, nonene-1, decene-1, butadiene, dicyclopentadiene, hexadiene, ethylidene norbornene and vinyl moieties.

Also included in the preferred ethylene polymers are blends of one ethylene polymer as described above with one or more other ethylene polymers as described above, or with one or more other polymers. Illustrative of such blends are ethylene polymers with one or more of the following: polypropylene, high pressure polyethylene, low-density polyethylene, ultra-low-density polyethylene, high density polyethylene, polybutene-1, and polar monomer/olefin copolymers such as ethylene/acrylic acid copolymers, ethylene/methyl acrylate copolymers, ethylene/ethyl acrylate copolymers, ethylene/vinyl acetate copolymers, ethylene/acrylic acid/ethyl acrylate terpolymers, acrylonitrile-butadiene-styrene polymers, ethylene/acrylic acid/vinyl acetate terpolymers, and the like, as well as the salts thereof, e.g., the ionomers.

Particularly preferred ethylene polymers for purposes of this invention are low pressure, substantially linear ethylene homopolymers and ethylene $C_3$ to $C_8$ alpha-olefin interpolymers having a density of about 0.84 to about 0.97, preferably about 0.875 to about 0.93. These interpolymers can be prepared by reacting a mixture containing about 50 to 99.9 mole percent, preferably about 75 to 96 mole percent ethylene, and from about 0.1 to 50 mole percent and preferably about 4 to about 25 mole percent of one or more $C_3$ to $C_8$ alpha olefins such as propene, butene-1, pentene-1, 4-methyl-pentene-1, hexene-1, heptene-1, octene-1, and the like, or a diolefin using a magnesium chloride/titanium chloride catalyst and employing low pressures on the order of about 15 to 300 psi as disclosed in U.S. Pat. No. 4,302,565. Other processes are known in which the catalyst can be a transition metal compound, e.g. chromium oxide, as well as any of the known Ziegler and Natta catalysts, or a metallocene.

2. Hindered Amine Light Stabilizer (HALS)

"Hindered amine light stabilizers" (HALS) are known in the art. Generally, HALS are organic compounds incorporating one or more piperidine moieties having the formula

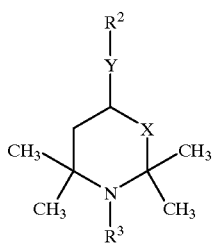

wherein X is either $CH_2$ or a carbonyl group $C=O$, Y is either O or $NR^4$, $R^4$ is $(R^5)_jW$, $R^5$ is a divalent alkylene group of $C_1$–$C_{10}$, j is 0 or 1, W is hydrogen or a linkage to another piperidine moiety so as to form a polymer, $R^3$ is $(R^6)_jW$, where $R^6$ is oxygen, $-OC_nH_{2n}-$, or a linear or branched divalent alkylene group of 1–10 carbon atoms, n is 1 to 12 and $R^2$ is one of the following:
  a. a divalent group of structure $-(C=O)-C_mH_{2m+1}-(C=O)Z$ where m is from 2 to 8, and Z is a heteroatom, a heterocyclic structure or a linkage to another piperidine moiety which if W is also a linkage may form a polymeric structure;
  b. a single bond connected to the $R^4$ group of another piperidine moiety so as to form a polymeric structure;
  c. if Y is $NR^4$, a triazine ring, which may have heteroatoms thereon and/or may be connected with other piperidine moieties to form a polymeric structure; or
  d. a group having the formula: $-(C_pH_{2p+1})-Si(CH_3)_qO_{(3-q)/2}$; in which p is an integer from 0 to 8, q is an integer from 0 to 2, and the silicon atom is connected through (3–q) oxygen atoms to an alkyl group of 1–18 carbon atoms or to other silicon atoms that are either the silicon atoms of identical heterocyclic moieties or are the silicon atoms of $Si(CH_3)_rO_{4-r}$ moieties where r is an integer from 0 to 3.

Included are structures in which several of the piperidine moieties are linked together through either one or more of the groups $R^2$, $R^3$, and $R^4$. Illustrative of such HALS are compounds described for example in U.S. Pat. Nos. 4,946,880, 4,948,888, 4,927,898, and 5,418,267; and European patent application 0388321, which are incorporated herein by reference. Also illustrative of such HALS are those identified in Gächter and Müller, *Plastics Additives*, 3rd Ed., 1990, section 3.5.3 as HALS-1 through HALS-8, which is also incorporated herein. Preferred HALS are the commercially available HALS sold by Ciba-Geigy as TINUVIN 770, TINUVIN 622, CHIMASSORB 944, and CHIMASSORB 119.

In the practice of our invention, it is useful but not required that the solution of HALS in silane be stable during storage for an extended period of time. For this reason, certain HALS may be preferred over others. For example, it has been found that TINUVIN 622 HALS forms a gel when allowed to stand for several days after dissolving in vinyltrimethoxysilane, whereas CHIMASSORB 944 does not. Also in the practice of our invention it has been found that storage of the solution for extended periods of time at low ambient temperature may be desirable, such as during the winter in cold climates. In such cases, it is preferred to use a HALS based on a silicone compound, such as UVASIL 299, which remains soluble in vinyltrimethoxysilane even at −40° C. in contrast to other HALS that crystallize out of solution at such temperatures.

The HALS should be present at 1.0 to 10.0 weight percent of the silane solution, and in the polymeric composition it should be present at 0.1 to 0.5 weight percent.

3. Olefinically Unsaturated Silane

Silanes suitable for grafting onto and crosslinking with an olefinic polymer according to the present invention are of the general formula:

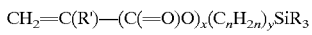

$$CH_2=C(R')-(C(=O)O)_x(C_nH_{2n})_ySiR_3$$

wherein: R' represents a hydrogen atom or methyl group; x and y are 0 or 1 with the proviso that when x is 1, y equals 1; n is an integer from 1 to 12 inclusive, preferably 1 to 4; and each R independently represents a hydrolyzable organic group such as an alkoxy group having 1 to 12 carbon atoms (e.g., methoxy, ethoxy, propoxy, butoxy), or a lower alkyl group having 1 to 6 carbon atoms inclusive, with the proviso that not more than one of the three R groups is an alkyl group.

Some representative examples of the unsaturated silanes useful in the present process are vinyltriethoxysilane, vinyltrimethoxysilane, vinyl tri-iso-butoxysilane, allyltriethoxysilane, vinyltri-n-butoxysilane, hexenyltri-iso-butoxysilane, allyltri-n-pentoxysilane, dodecenyltri-n-octoxysilane, heptenyltri-n-heptoxysilane, allyltri-iso-propoxysilane, pentenyltri-n-propoxysilane, sec-butenyltriethoxysilane, and 3-methacryloxypropyl-trimethoxysilane.

Preferably, the silanes used in the process of the present invention will contain a vinyl or methacryloxypropyl group as the group reacting with the free radical sites formed in the polymer by the free radical generator. These silanes are commercially available from OSi Specialties Inc. as SILQUEST® A-171, A-151, and A-174 silanes. The most preferred silane is vinyl trimethoxysilane.

The amount of silane is chosen to be near the minimum amount needed to provide the desired degree of crosslinking. The proportion of hydrolyzable silane based on the weight of the ethylene polymer is not narrowly critical and can range from 0.1 to 10 wt. %, preferably 0.7 to 3 wt. %, of silane based on the total weight of polymer.

4. Free Radical Generator

The free radical generator used in the present invention may be any compound that is capable of producing free radical sites in the base polymer, the reaction conditions depending on temperature and retention time needed for achieving a suitable half life. Suitable free radical generators are organic peroxides and peresters such as tert-butylperoxypivalate, tert-butylperoxy-2-ethylhexanoate, dicumyl peroxide, $\alpha,\alpha$-bis(tert-butylperoxy)di-isopropylbenzene, di-tert-butyl peroxide, tert-butyl cumyl peroxide, di-benzoyl peroxide, 2,5-dimethyl-2,5-bis (tert-butylperoxy) hexane, tert-butyl perbenzoate, and combinations thereof. Also an azo compound such as 2,2-azo-bis (2,4-dimethylvaleronitrile) and azo-bis-iso-butyronitrile may be used herein. Most preferred free radical generators are the peroxides, especially dicumyl peroxide and $\alpha,\alpha$-bis (tert-butylperoxy)di-isopropylbenzene.

The amount of free radical generator necessary in the present invention is not narrowly critical and can be varied over wide ranges, for example, from 0.01 wt. % to 0.4 wt. %, preferably 0.05 to 0.2 wt. %, based on the total weight of the extrudate, depending on the nature of the olefin polymer, the silane, the amounts of stabilizers present, the extrusion conditions and other factors which would be obvious to one of skill in the art.

5. Hydrolysis/Condensation Catalyst

Hydrolysis/condensation catalysts used in the present invention catalyze the crosslinking of the extrudate (i.e., silane grafted olefin polymer) by reaction of the extrudate with water. The catalysts may accelerate either the hydrolysis reaction of the grafted silyl groups with water to form silanols, or the condensation of silanols to form Si—O—Si bonds, or both. These catalysts may be Lewis acids such as metal carboxylates, for example: dibutyltin dilaurate, dioctyltin dilaurate, stannous acetate, stannous octoate, dibutyltin dioctoate, dioctyltin-bis(isooctyl maleate), dioctyltin-bis (isooctyl thioglycolate), as well as organometal compounds such as titanium esters and chelates, for example: tetrabutyl titanate, tetranonyl titanate, and bis (acetylacetonyl) di-isopropyl titanate; organic bases, such as, triethylamine, hexylamine, dibutylamine, and piperidine; and protic acids, such as fatty acids and mineral acids. Preferred hydrolysis/ condensation catalysts include dibutyltin dilaurate (DBTDL), dioctyltin dilaurate (DOTDL) and stannous octoate.

The proportion of silanol condensation catalyst used is not narrowly critical, illustratively ranging from 0.01 to 0.2 wt. %, preferably 0.02 to 0.1 wt. %, based on the total weight of the extrudate.

When it is desired to store the crosslinkable polymer for some time prior to fabrication and crosslinking, a hydrolysis/condensation catalyst should not be added during the production of the silane grafted polymer. Instead, the hydrolysis/condensation catalyst should be mixed with the silane grafted polymer at the fabrication step. However, if it is desired to perform the production and fabrication of the crosslinkable polymer in a single step, the hydrolysis/condensation catalyst should be included. An extruder would be used as the mixing and compounding apparatus in this case.

6. Optional Additives

Other additives that are commonly utilized in crosslinking may be used herein. These include additional stabilizers and antioxidants commonly used in the processing of polyolefins and combinations thereof. In addition, minerals for improving flame retardancy or as an internal source of water for the crosslinking, e.g., alumina trihydrate or magnesium hydroxide; zeolites; or mineral fillers such as calcium carbonate, talc, mica, silica and silicates; or carbon black may be used. Phenolic antioxidants, phosphites or aryl amine antioxidants may be used. Metal deactivators may be also be used, but are not required.

Use

The present invention includes blending the olefinically unsaturated silane, the HALS compound, and the free radical generator, optionally with heating and stirring, to produce a homogeneous solution with the silane as the solvent. Optionally, other optional additives and the hydrolysis/condensation catalyst may be added to the same solution. Mild heating may accelerate the dissolution of solid ingredients, i.e., HALS and free radical generator, in the silane. However, if heating is applied, only mild heating may be used, to avoid decomposition of the free radical generator and polymerization of the olefinically unsaturated silane. Heating the mixture to no more than 50° C., preferably around 40° C. is preferred.

Dissolving the HALS compound and the free radical generator in the liquid silane, possibly along with other additives and a hydrolysis/condensation catalyst, prior to mixing them with the polymer and carrying out the grafting step provides surprising benefits. This silane solution allows the ingredients to be metered together in easily controlled ratio and simplifies the dosing requirements. It also simplifies logistics and inventory requirements at the manufacturing site. Moreover, dispersing the HALS will lessen the amount of HALS, a relatively expensive component, required. Thus, this method of manufacture and composition is advantageous over prior methods and compositions.

The concentrations of solid ingredients in the solution will be found to be limited by the solubility of said solid ingredients in the silane. It is necessary to choose solid ingredients that are sufficiently soluble to form a thermodynamically stable solution at the lowest storage temperature to which the solution will be exposed prior to use. Generally, this is not a problem because the amounts of additives in the solution are low enough that they dissolve readily in the silane and do not re-precipitate when cooled to the lowest commonly encountered storage temperatures.

The silane solution of HALS compound, free radical generator, and optional additives can be mixed with the olefin polymer to provide grafting using any of several conventional methods well known to those skilled in the art. For example, the solution may be soaked into the polymer using mild heating, may be sprayed onto the polymer pellets just before they are melted in an extruder, may be injected into the molten polymer within an extruder, or may be supplied in a solid form as part of a masterbatch as described in U.S. Pat. No. 5,112,919. This mixture should be heated for a sufficient time to cause the silane to graft to the polymer by free radical processes. After the grafting is complete, the polymer is still thermoplastic and needs to be crosslinked.

It may be crosslinked by mixing the grafted polymer with a hydrolysis/condensation catalyst, formed into its desired final shape, and crosslinked by exposure to moisture. Optionally, the hydrolysis/condensation catalyst may be dissolved in the silane solution of this invention, but in that case the grafted polymer should be immediately formed into its final shape, such as by extruding onto wire, because with the catalyst present the shelf life of the grafted polymer will be relatively short. These steps are well known in the art.

Said crosslinked polymers may be used for a variety of purposes, including wire and cable insulation, heat shrink tubing and pipe.

EXAMPLE 1

A clear liquid solution was prepared by stirring for one hour in a closed flask with a magnetic stirrer at 40° C.:

| | |
|---|---:|
| vinyltrimethoxysilane | 81.2 g |
| IRGANOX 1010 phenolic antioxidant (Ciba-Geigy) | 3.2 g |
| IRGANOX 1330 phenolic antioxidant (Ciba-Geigy) | 4.0 g |
| CHIMASSORB 944 HALS | 5.0 g |
| Dicumyl peroxide | 6.6 g |

20 grams of this solution was blended by rolling for one hour at room temperature in a closed, dry container with 80 grams of porous particulate polyethylene foam, composed of LDPE with melt index 6 and density 0.923 g/cm$^3$, to make a solid silane masterbatch. A solid blend was prepared from 9% by weight of this solid silane masterbatch, 45% ESCORENE LD180BA (high-pressure LDPE, MI 2 g/10 min, density 0.919 g/cm$^3$) (Exxon Chemical Company), 41% DOWLEX 2035E (LLDPE, octene comonomer, MI 6 g/10 min, density 0.919 g/cm$^3$)(Dow Chemical), and 5% catalyst masterbatch containing dibutyltin dilaurate and metal deactivator Ciba-Geigy MD-1024 in LDPE MI 2, density 0.923. The solid blend was passed through a Leistritz single-screw extruder of diameter 36 mm and length 90 cm, with a barrier screw having 2:1 compression ratio, using a temperature profile of 150/180/200/210/220° C. from feed zone to die, at a screw speed of 20 rpm and formed onto a copper wire of 1.37 mm diameter with insulation thickness 0.8 mm using a crosshead die. The coated wire was immersed in 90° C. water for 4 hr to crosslink the polyethylene coating.

Measurement on the insulation showed that it had tensile strength at break (IEC 811-1-1) 26.5 MPa, elongation at break (IEC 811-1-1) 545%, and heat elongation (IEC 540, 20 N/cm$^2$, 15 min, 200° C.) 30%; residual hot set 0%. After 10 days in a circulating air oven at 150° C. (IEC 811-1-2), the tensile strength and elongation retained 92% and 93.5% of their original values, respectively, illustrating that the insulation was crosslinked and stabilized against oxidation. The extruded insulation showed no discoloration after exposure to sunlight for one month, whereas insulation made without the HALS compound was distinctly yellow after similar exposure.

EXAMPLE 2

A clear liquid solution was prepared by stirring for 10 minutes in a closed flask with a magnetic stirrer at room temperature:

| | |
|---|---:|
| vinyltrimethoxysilane | 84 g |
| IRGANOX 1010 phenolic antioxidant (Ciba-Geigy) | 6 g |
| UVASIL 299 LM HALS (Great Lakes Chemical) | 6 g |
| tert-butyl cumyl peroxide | 4 g |

A portion of this solution was stored at −40° C. for one week, after which time it remained clear and transparent, with no precipitate. The solution from Example 1 showed formation of precipitate within 2 hours at −40° C.

20 grams of this solution was blended by rolling for one hour at room temperature in a closed, dry container with 80 grams of porous particulate polyethylene granules (SPHERILENE LLDPE from Montell, pore volume approx. 20% by mercury porosimetry, melt index 3.2, density 0.923 g/cm$^3$), to make a solid silane masterbatch. A solid blend was prepared from 75 g of this solid silane masterbatch, 425 g ESCORENE LL 1004 YB (LLDPE, MI 2.8 g/10 min, density 0.918 g/cm$^3$) (Exxon Chemical Company), 500 g LOTRENE CD-0230 (LDPE, MI 2 g/10 min, density 0.923 g/cm$^3$)(Qapco Chemical). The solid blend was passed through a Leistritz single-screw extruder of diameter 36 mm and length 90 cm, with a barrier screw having 2:1 compression ratio, using a temperature profile of 150/180/200/210/220° C. from feed zone to die, at a screw speed of 20 rpm and pelletized. The pellets were thermoplastic, with melt index (2.16 kg, 190° C.) 0.26 g/10 min.

The thermoplastic pellets (42.75 g) were blended with the catalyst/antioxidant masterbatch described in Example 1 (2.25 g) and the blend was kneaded in a Brabender Plasticorder mixing bowl at 170° C. for 10 minutes at 20 rpm to give a compound. The compound was compression-molded into a plaque of thickness 1.5 mm and immersed in water at 95° C. for 4 hours to cure it. Measurements on the cured polymer showed that it had tensile strength at break (IEC 811-1-1) of 20.3 MPa, elongation at break (IEC 811-1-1) 620%, heat elongation (IEC 540,20 N/cm$^2$, 15 min, 200° C.) 70%, and residual hot set) 0%.

The plaque was exposed to ultraviolet light (Xenotest 1200 weatherometer, 180,000 lux radiation intensity, 90% relative humidity, 50° C.) for 7 days. No discoloration was observed. In comparison, a molded specimen produced from a similar formulation without the HALS component was dark yellow after the same period of exposure.

We claim:

1. A composition consisting essentially of:

a. an olefinically unsaturated silane;

b. a hindered amine light stabilizer compound; and c. a free radical generator.

2. The composition of claim 1 additionally comprising a hydrolysis/condensation catalyst.

3. The composition of claim 1 additionally comprising one or more optional ingredients selected from the group consisting of: stabilizers, antioxidants, metal deactivator, and mineral fillers.

4. A composition according to claim 1 wherein the silane is of the formula:

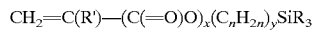

wherein: R' represents a hydrogen atom or methyl group; x and y are 0 or 1 with the proviso that when x is 1, y equals 1; n is an integer from 1 to 12 inclusive; and each R independently represents an alkoxy group having 1 to 12 carbon atoms or a lower alkyl group having 1 to 6 carbon atoms inclusive, with the proviso that not more than one of the three R groups is an alkyl group.

5. A composition according to claim 4 wherein n is 1 to 4.

6. A composition according to claim 4 wherein R is methoxy, ethoxy, propoxy or butoxy.

7. A composition according to claim 1 wherein the free radical generator is selected from the group consisting of: peresters, azo compounds, peroxides and combinations thereof.

8. A composition according to claim 1 wherein the amine is of the formula:

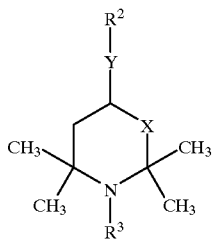

wherein X is either $CH_2$ or a carbonyl group C=O, Y is either O or $NR^4$, $R^4$ is $(R^5)_jW$, $R^5$ is a divalent alkylene group of $C_{1-C10}$, j is 0 or 1, W is hydrogen or a linkage to another piperidine moiety so as to form a polymer, $R^3$ is $(R^6)_jW$, where $R^6$ is oxygen, $-OC_nH_{2n}-$, or a linear or branched divalent alkylene group of 1–10 carbon atoms, n is 1 to 12 and $R^2$ is one of the following:

a. a divalent group of structure $-(C=O)-C_mH_{2m+1}-(C=O)Z$ where m is from 2 to 8, and Z is a heteroatom, a heterocyclic structure or a linkage to another piperidine moiety which if W is also a linkage may form a polymeric structure;

b. a single bond connected to the $R^4$ group of another piperidine moiety so as to form a polymeric structure;

c. if Y is $NR^4$, a triazine ring, which may have heteroatoms thereon and/or may be connected with other piperidine moieties to form a polymeric structure; or d. a group having the formula: $-(C_pH_{2p+1})-Si(CH_3)_qO_{(3-q)/2}$; in which p is an integer from 0 to 8, q is an integer from 0 to 2, and the silicon atom is connected through (3-q) oxygen atoms to an alkyl group of 1–18 carbon atoms or to other silicon atoms that are either the silicon atoms of identical heterocyclic moieties or are the silicon atoms of $Si(CH_3)_rO_{4-r}$ moieties where r is an integer from 0 to 3.

9. A composition according to claim 8 wherein $R^2$ is a group having the formula $-(C_pH_{2p+1})-Si(CH_3)_qO_{(3-q)/2}$ in which p is an integer from 0 to 8, q is an integer from 0 to 2, and the silicon atom is connected through (3-q) oxygen atoms to an alkyl group of 1–18 carbon atoms or to other silicon atoms that are either the silicon atoms of identical heterocyclic moieties or are the silicon atoms of $Si(CH_3)_rO_{4-r}$ moieties where r is an integer from 0 to 3.

10. A composition according to claim 9 wherein the hindered amine light stabilizer is UVASIL 299.

* * * * *